United States Patent
Guo et al.

(10) Patent No.: US 11,929,048 B2
(45) Date of Patent: Mar. 12, 2024

(54) METHOD AND DEVICE FOR MARKING TARGET CELLS, STORAGE MEDIUM AND TERMINAL DEVICE

(71) Applicant: PING AN TECHNOLOGY(SHENZHEN)CO., LTD., Shenzhen (CN)

(72) Inventors: Bingxue Guo, Shenzhen (CN); Jiaping Wang, Shenzhen (CN); Weiwei Xie, Shenzhen (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 397 days.

(21) Appl. No.: 17/207,144

(22) Filed: Mar. 19, 2021

(65) Prior Publication Data
US 2021/0209328 A1 Jul. 8, 2021

Related U.S. Application Data (63) Continuation-in-part of application No. PCT/CN2019/118692, filed on Nov. 15, 2019.

(30) Foreign Application Priority Data

Jan. 24, 2019 (CN) .......................... 201910066278.1

(51) Int. Cl.
*G06K 9/00* (2022.01)
*G06T 7/11* (2017.01)
(Continued)

(52) U.S. Cl.
CPC .................. *G09G 5/37* (2013.01); *G06T 7/11* (2017.01); *G06T 7/73* (2017.01); *G06T 11/001* (2013.01);
(Continued)

(58) Field of Classification Search
CPC ...... G09G 5/37; G09G 5/026; G09G 2340/02; G09G 2380/08; G06T 7/11; G06T 7/73;
(Continued)

(56) References Cited

U.S. PATENT DOCUMENTS

2017/0193175 A1  7/2017 Madabhushi et al.
2022/0319002 A1* 10/2022 Cosatto ................ G06V 20/695

FOREIGN PATENT DOCUMENTS

CN      103473739 A      12/2013
CN      108830149 A  *  11/2018  ......... G06K 9/00664
(Continued)

OTHER PUBLICATIONS

English Translation to International Search Report for Application No. PCT/CN2019/118692.
(Continued)

*Primary Examiner* — Mekonen T Bekele
(74) *Attorney, Agent, or Firm* — CANTOR COLBURN LLP (57) ABSTRACT

A target cell marking method, including: determining an original image format of the original scanned image, and converting the original scanned image into a first image in a preset image format; segmenting the first image into a plurality of image blocks and recording arrangement positions of the image blocks in the first image; respectively inputting the image blocks into a preset deep learning detection model to obtain first position information of target cells in the image blocks; determining second position information of the target cells in the first image according to the first position information and the corresponding arrangement positions; integrating the image blocks according to the arrangement positions to obtain a second image, and marking the target cells in the second image; and converting the second image marked by the target cells into a third
(Continued)

image in the original image format, and displaying the third image.

20 Claims, 5 Drawing Sheets

(51) Int. Cl.
  *G06T 7/73*    (2017.01)
  *G06T 11/00*    (2006.01)
  *G06V 10/764*   (2022.01)
  *G06V 10/82*    (2022.01)
  *G06V 20/69*    (2022.01)
  *G09G 5/37*    (2006.01)
  *G06F 3/14*    (2006.01)

(52) U.S. Cl.
  CPC ............ *G06V 10/764* (2022.01); *G06V 10/82* (2022.01); *G06V 20/695* (2022.01); *G06V 20/698* (2022.01); *G06F 3/14* (2013.01); *G06T 2200/24* (2013.01); *G06T 2207/20021* (2013.01); *G06T 2207/20081* (2013.01); *G06V 2201/03* (2022.01)

(58) Field of Classification Search
  CPC ............... G06T 11/001; G06T 2200/24; G06T 2207/20021; G06T 2207/20081; G06T 7/0012; G06T 2207/30024; G06V 10/764; G06V 10/82; G06V 20/695; G06V 20/698; G06V 2201/03; G06F 3/14; G06F 18/2413; Y02P 90/30
  See application file for complete search history.

(56) References Cited

FOREIGN PATENT DOCUMENTS

| | | |
|---|---|---|
| CN | 108830149 A | 11/2018 |
| CN | 109886928 A | 6/2019 |

OTHER PUBLICATIONS

International Search Report for Application No. PCT/CN2019/118692.

Written Opinion for Application No. PCT/CN2019/118692.

* cited by examiner

METHOD AND DEVICE FOR MARKING TARGET CELLS, STORAGE MEDIUM AND TERMINAL DEVICE

CROSS-REFERENCE TO RELATED APPLICATION

This is a continuation-in-part of International Application PCT/CN2019/118692 with an international filing date of Nov. 15, 2019, which claims priority to Chinese patent application No. 201910066278.1, filed with China National Intellectual Property Administration on Jan. 24, 2019, and entitled "method and device for marking cell targets, storage medium and terminal device", the contents each of which are incorporated herein by reference thereto in their entirety.

TECHNICAL FIELD

The present disclosure relates to the technical field of image processing, and particularly relates to a method for marking cell targets, a device for marking target cells, a storage medium, and a terminal device.

BACKGROUND

Detection and marking of target cells play a very important role in the fields of biology and medicine, and may facilitate relevant personnel to perform cell analysis and make research, and the like, the conventional method for detecting and marking target cells is usually achieved by either performing manual segmentation on cytoplasm or cell nucleus, or performing detection and marking on target cells according to an image processing algorithm based on simple feature extraction.

The method of detecting and marking target cells through cell segmentation is time-consuming and laborious, and depends on a reader's subjective determination; the image processing algorithm based on simple feature extraction is only applicable to cell detection and marking of smaller images in a specific image format, the image processing formats are not only limited, omission and incompleteness of detecting and marking of target cells may also be caused when target cell detection and marking are performed on a larger image, the comprehensiveness of target cell detection and marking cannot be achieved, and the accuracy and reliability of detecting and marking of target cells are greatly reduced.

SUMMARY

Embodiments of the present disclosure provides a method and image-based target cell marking device, a computer-readable storage medium and a terminal device, which may automatically detect and mark target cells of larger images in different image formats, avoid omission of detection of target cells, ensure the comprehensiveness of detecting and marking of target cells, and may also realize visualization of detected results, such that subjective dependence on reader is reduced, and the accuracy and the reliability of detecting and marking of target cell are improved.

In the first aspect, embodiments of the present disclosure provide an image-based target cell marking method, including:
obtaining an original scanned image, determining an original image format of the original scanned image, and converting the original scanned image into a first image in a preset image format;
segmenting the first image into a plurality of image blocks according to a preset image segmentation mode, and recording arrangement positions of the image blocks in the first image;
respectively inputting the image blocks into a preset deep learning detection model to obtain first position information of target cells in the image blocks through the deep learning detection model;
determining second position information of the target cells in the first image according to the first position information and corresponding arrangement positions;
integrating the image blocks according to the arrangement positions, and marking the target cells in the second image according to the second position information, wherein the second image is obtained by integrating the image blocks; and
converting the second image marked by the target cells into a third image in the original image format, and displaying the third image.

In the second aspect, embodiments of the present disclosure provide a computer readable storage medium, which stores a computer readable instruction, the computer readable instruction is configured to, when being executed by a processor, implement the steps in the image-based target cell marking method in the first aspect.

In the third aspect, embodiments of the present disclosure provide a terminal device, including a memory, a processor and a computer readable instruction stored in the memory and executable by the processor, the processor is configured to execute the computer readable instruction to implement following steps of:
obtaining an original scanned image, determining an original image format of the original scanned image, and converting the original scanned image into a first image in a preset image format;
segmenting the first image into a plurality of image blocks according to a preset image segmentation mode, and recording arrangement positions of the image blocks in the first image;
respectively inputting the image blocks into a preset deep learning detection model to obtain first position information of target cells in the image blocks through the deep learning detection model;
determining second position information of the target cells in the first image according to the first position information and corresponding arrangement positions;
integrating the image blocks according to the arrangement positions, and marking the target cells in the second image according to the second position information, wherein the second image is obtained by integrating the image blocks; and
converting the second image marked by the target cells into a third image in the original image format, and displaying the third image.

In the embodiments of the present disclosure, an automatic detection of target cells of larger images in different image formats may be achieved through format conversion, image segmentation and depth learning detection model, the target cells may be automatically marked according to the detected position information and the arrangement positions of target cells when image segmentation is performed, omission of detection of target cells is avoided, the comprehensiveness of detecting and marking of target cells is ensured, the accuracy and the reliability of detecting and marking of target cells are improved; additionally, subjective dependence on the reader may be reduced through visual display of target cell marking results after format reduction,

DESCRIPTION OF THE EMBODIMENTS

In order to make the purpose and the features of the present disclosure be more obvious and more understandable, the technical solutions in the embodiments of the present disclosure will be described clearly and comprehensively with reference to accompanying drawings in the embodiments, it is apparent that, the embodiments described below are only some embodiments of the present disclosure instead of the entire of the embodiments. Based on the embodiments in the present disclosure, some other embodiments which are obtained by the person of ordinary skill in the art at the premise of paying no creative labor are all included in the protection scope of the present disclosure.

Figure 1:
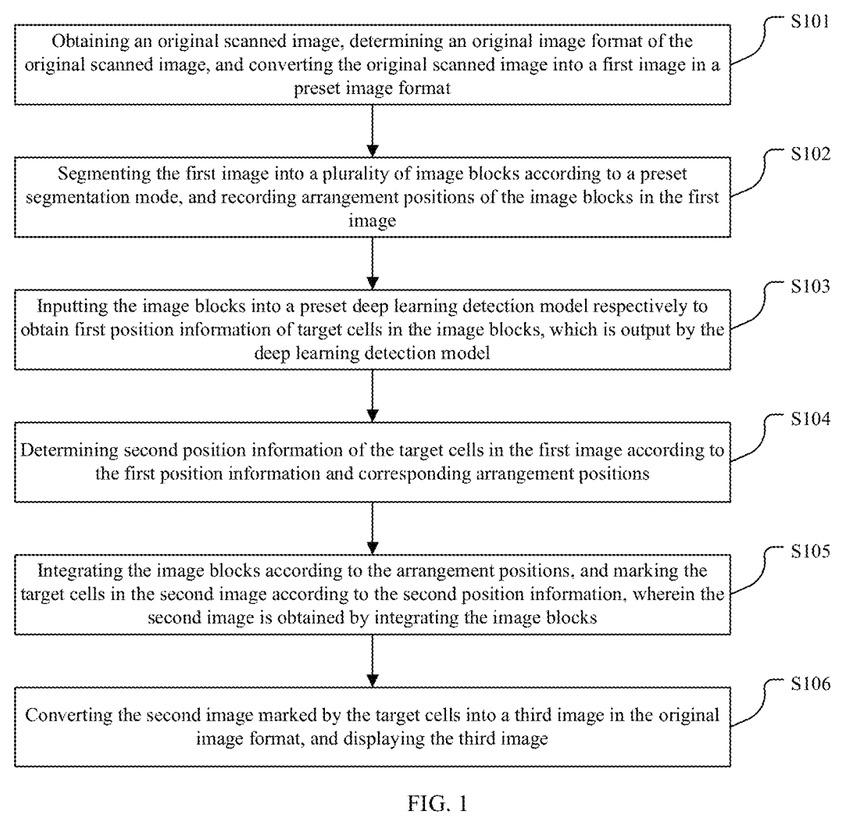
FIG. 1 illustrates a flowchart of an exemplary image-based target cell marking method in one embodiment of the present disclosure.

Referring to FIG. 1, one embodiment of the present disclosure provides an image-based target cell marking method, the target cell marking method includes:

in step of S101, obtaining an original scanned image, determining an original image format of the original scanned image, and converting the original scanned image into a first image in a preset image format;

In the embodiment of the present disclosure, the original image format may be ".sys", ".kfb", ".ndpi" or ".tif". The original scanned image is usually a fully scanned image, wherein the image size may be about 2 Gb, and the pixel may be about 100000×100000. The preset image format may be an image format that may be easily processed by the computer, such as ".jpg" or ".png", so that the speed and the efficiency of image analysis and processing are improved. In other words, in the embodiment of the present disclosure, the original scanned images which are in various image formats and are obtained by scanning through various scanners, such as a full scanning TCT image, may be acquired; when the original scanned image is in an image format that is inconvenient to be analyzed and processed by the computer, such as the ".sys" format, the original scanned image may be converted into a first image in the preset image format, for example, the original scanned image may be converted into the first image in the ".jpg" or ".png" format, thereby facilitating analysis and processing the original scanned image using the computer.

In step of S102, segmenting the first image into a plurality of image blocks according to a preset image segmentation mode, and recording arrangement positions of the image blocks in the first image;

In this embodiment, after the first image is obtained by performing format conversion on the original scan image, the first image may be segmented into a plurality of image blocks having a preset image size according to a preset image segmentation manner such as in a tiled segmentation manner, for example, the first image is segmented into 1024×1024 image blocks, moreover, the arrangement positions of the image blocks in the first image may be recorded, for example, the image blocks may be denominated according to arrangement sequences of the image blocks in the first image.

Preferably, in the embodiment of the present disclosure, segmenting the first image into a plurality of image blocks according to a preset image segmentation mode may include:

step a, obtaining distribution conditions of cells and an image size of the first image; step b, segmenting the first image into the plurality of image blocks of a preset size according to the distribution conditions of cells and the image size.

Regarding the step a and the step b described above, in this embodiment of the present disclosure, when image segmentation is performed on the first image, the distribution conditions of cells and the image size of the first image may be firstly acquired, then, the size of a segmented image block and a segmentation position may be determined according to the distribution conditions of cells and the image size, so that the first image is segmented according to the determined segmentation position and the size of image block, in this way, the first image is segmented into a plurality of image blocks of the preset image size, and the preset image size may be the determined image block size.

In step of S103, respectively inputting the image blocks into a preset deep learning detection model to obtain first position information of the target cells in the image blocks through the deep learning detection model;

it should be understood that after obtaining the image blocks through image segmentation, the image blocks may be respectively input into the preset deep learning detection model in order that the preset deep learning model detects the first position information of the target cells in the image blocks. In the embodiment of the present disclosure, the image blocks may also be optimized by the methods including denoising, sharpening, contrast enhancement to improve the detection accuracy of the deep learning detection model, before the image blocks are input into the preset deep learning detection model.

Figure 2:
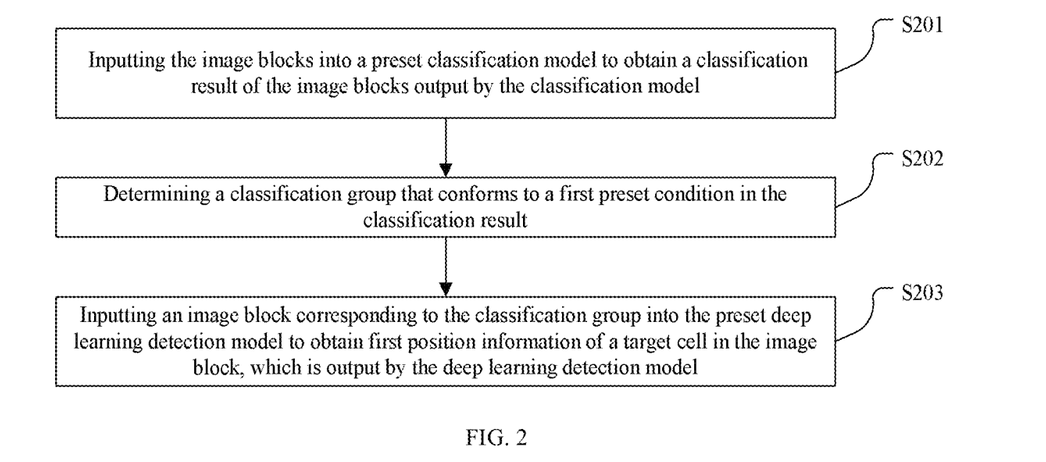
FIG. 2 illustrates a schematic flowchart of obtaining first position information in an application scenario in a target cell marking method in one embodiment of the present disclosure.

Furthermore, as shown in FIG. 2, the step of respectively inputting the image blocks into a preset deep learning detection model to obtain first position information of the target cells in the image blocks through the deep learning detection model includes:

in step of S201, respectively inputting the image blocks into a preset classification model to obtain a classification result of each of the image blocks through the classification model;

in step of S202, determining a classification group that meets a first preset condition in the classification result;

in step of S203, inputting an image block corresponding to the classification group into the preset deep learning detection model to obtain first position information of a target cell in the image block through the deep learning detection model.

Regarding the aforesaid steps S201-S203, it should be understood that, the classification model may be obtained by training a convolutional neural network, the classification model may be used to perform preliminary judgment on the target cells in the image block, in other words, the classification module is used to determine whether there exists a target cell in each of the image blocks to find an image block including a target cell, and the image block including target cell is input into the deep learning detection model, so that the target cells in these image blocks are accurately detected and positioned through the deep learning detection model, the quantity of inputs of image blocks is reduced through preliminary screening, the load of image processing of the deep learning detection model is reduced, and thus the detection speed and the detection efficiency of detection of target cells are improved accordingly.

Figure 3:
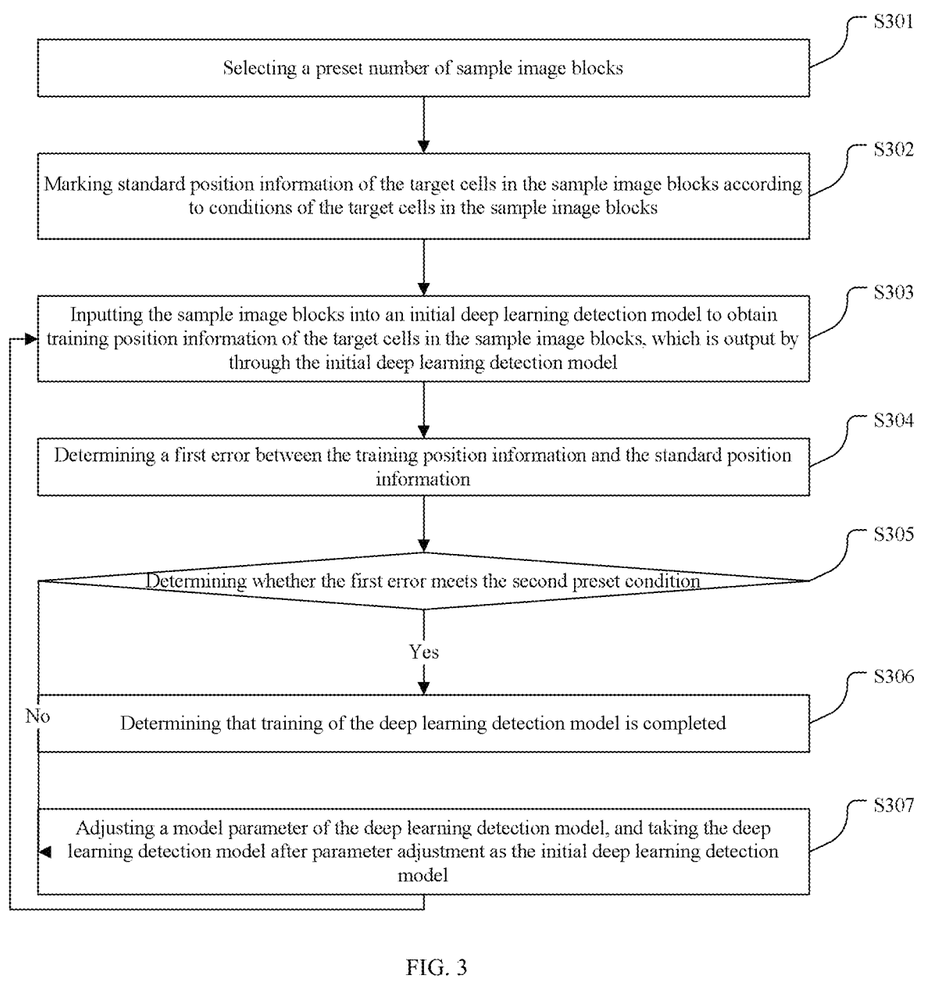
FIG. 3 illustrates a schematic flowchart of training deep learning detection model in an application scenario in a target cell marking method in one embodiment of the present disclosure.

Optionally, as shown in FIG. 3, in one application scenario, the deep learning detection model may be obtained by training according to the following steps:

step S301, selecting a preset number of sample image blocks;

step S302, marking standard position information of each of the target cells in the sample image blocks according to the conditions of target cells in the sample image blocks;

step S303, inputting the sample image blocks into an initial deep learning detection model to obtain training position information of each of the target cells in the sample image blocks through the initial deep learning detection model;

step S304, determining a first error between the training position information and the standard position information;

step S305, determining whether the first error meets the second preset condition;

step S306, determining that training of the deep learning detection model is completed, if the first error meets the second preset condition;

step S307, adjusting a model parameter of the deep learning detection model, taking the deep learning detection model after parameter adjustment as the initial deep learning detection model, and returning to perform the step of inputting the sample image blocks into the initial deep learning detection model and the subsequent steps, if the first error does not meet the second preset condition.

Regarding the aforesaid step S301, before performing training of the deep learning detection model, a training sample for training needs to be selected previously, that is, a preset number of sample image blocks needs to be obtained previously, and these sample image blocks may be the image blocks containing target cells or be the image blocks that do not contain target cells. It should be understood that the greater the data amount of these training samples, the better the training effect on the deep learning detection model, thus, training samples may be selected as much as possible in this embodiment of the present disclosure.

Regarding the step S302, the standard position information of the target cells in the sample image blocks needs to be marked according to distribution conditions of the target cells in the sample image blocks after the sample image blocks for training are obtained, for example, frame selection may be performed on the target cells in the sample image blocks.

Regarding the step S303, the sample image blocks may be input into the initial deep learning detection model to obtain initial training position information of the target cells in the sample image blocks, after the standard position information of the target cells in the sample image blocks are marked. Since training of the initial depth learning detection model has not yet been completed, there may exists certain deviation and error between the output training position information and the marked standard position information.

Regarding the step S304 and the S305, after the training position information is obtained, the error between the training position information and the corresponding standard position information may be determined, and whether the error meets a second preset condition is determined, the second preset condition may be such as whether the error is less than 5%. Here, the second preset condition may be determined when the specific deep learning detection model is trained, for example, the second preset condition may be set as the error is less than a certain threshold value, and the specific threshold value may be a percentage value, wherein the smaller the specific threshold value, the more stable the deep learning detection model which is obtained after the training is finally completed, and the higher the accuracy of recognition.

Regarding step S306, it may be understood that when the error between the training position information and the standard position information meets the second preset condition, for example, when the error between the training position information and the standard position information is less than 5%, completion of training of the deep learning detection model may be determined.

Regarding the step S307, when the error between the training position information and the standard position information does not meet the second preset condition, for example, when the error between the training position information and the standard position information is 10%, the model parameter of the deep learning detection model may be adjusted, and the deep learning detection model after parameter adjustment may be taken as the initial deep learning detection model, then, the training of the sample image blocks is performed again, the module parameter of the deep learning detection module is adjusted iteratively and the sample image blocks are trained by multiple times, so that the error between the training position information and the standard position information is minimized until the error between the final training position information and the standard position information meets the second preset condition.

Furthermore, in another application scenario, the deep learning detection model may also be trained according to the following steps: step c, selecting a preset number of sample image blocks; step d, marking the standard position information and the standard cell type of the target cells in the sample image blocks according to the conditions of the target cells in the sample image blocks; step e, inputting the sample image blocks into the initial deep learning detection model to obtain the training position information and the training cell types of the target cells in the sample image blocks through the initial deep learning detection model; step f, determining a second error between the training position information and the standard position information and determining a third error between the training cell type and the standard cell type; step g, adjusting the model parameter of the deep learning detection model and taking the deep learning detection model after parameter adjustment as the initial deep learning detection model, and returning to perform the step of inputting the sample image blocks into the initial deep learning detection model and the subsequent steps, if the second error does not meet a third preset condition or if the third error does not meet a fourth preset condition; step h, determining that training of the deep learning detection model is completed, if the second error meets the third preset condition and the third error meets the fourth preset condition.

It should be understood that, the training steps in this application scenario differs from the training steps in the aforesaid application scenario in that: training the cell type of the target cells is additionally included in this application scenario, that is, the cell types of the target cells in the sample image blocks may be marked previously when the deep learning detection model is trained in this scenario, so that the deep learning detection model is trained through recognizing and training the cell types marked in the sample image blocks, and the trained deep learning detection model may detect the cell types of the target cells in the image blocks.

It is worth noting that, when a detected target cell is an abnormal cell, training on anomaly type and anomaly level of the abnormal cell may also be additionally included in the training of the deep learning detection model, in this way, the trained deep learning detection model may not only detect position information and a cell type of an abnormal cell in each of the image blocks, but also detect the anomaly type and the anomaly level of the abnormal cell. The basic principle of recognizing and training of cell type, anomaly type, and anomaly level is the same as the basic principle of recognizing and training of the position information, and thus would not be repeatedly described here for brevity.

In step of S104, determining second position information of the target cells in the first image according to the first position information and the corresponding positions of arrangement.

It may be understood that, since the first position information is the position information of the target cells in the image blocks, thus, in order to mark the specific positions of the target cells in the original scanned image accurately, the position information of the target cells in the first image needs to be determined. Thus, in this embodiment of the present disclosure, after the first position information of the target cells in the image blocks are obtained, the second position information of the target cell in the image block in the first image may be determined according to the first position information and the position of arrangement of the corresponding image block in the first image, that is, the specific position information of the target cells in the image blocks in the first image is determined.

In step of S105, integrating the image blocks to obtain a second image according to the positions of arrangement, and marking the target cells in the second image according to the second position information.

It may be understood that, after the position information of the target cells in the image blocks in the first image is determined, that is, after the second position information is determined, all image blocks may be integrated according to the arrangement positions of the image blocks in the first image, and the corresponding target cells may be marked according to the second position information in the integrated second image. In this embodiment, the integrated second image may be the same as the first image.

In step of S106, converting the second image marked by the target cells into a third image in the original image format, and displaying the third image.

In this embodiment of the present disclosure, since the integrated second image is the same as the first image, that is, the image format of the integrated second image obtained by image integration is the same as the image format of the first image either, for facilitating a reader to read an image marked by target cells using a reading software, the second image after marking by target cells may be restored to the third image in the original image format, and the third image may be displayed on the corresponding reading software, in this way, the result of markings of the target cells in the original scanned image is displayed intuitively, a subjective dependence on the reader is reduced, and the reader may read images conveniently.

In this embodiment of the present disclosure, the second image after marking may also be converted into the third image in other image format firstly, and then be displayed, wherein the image format that needs to be reductive may be determined according to the image format of the reading software used by relevant person.

Figure 4:
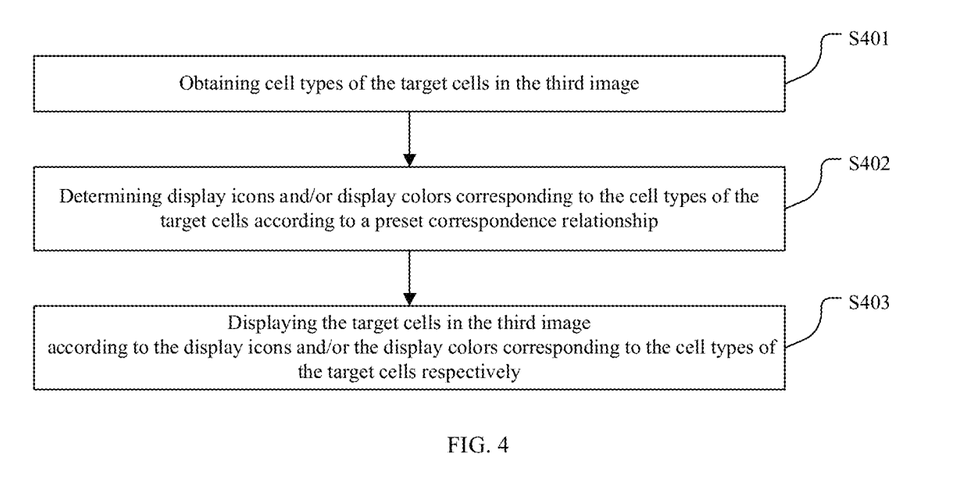
FIG. 4 illustrates a schematic flowchart of displaying marking result in an application scenario in a target cell marking method in one embodiment of the present disclosure.

Preferably, as shown in FIG. 4, in this embodiment of the present disclosure, the step of displaying the third image may include the following steps:

step S401, obtaining cell types of the target cells in the third image; step S402, determining display icons and/or display colors corresponding to the cell types of the target cells according to a preset correspondence relationship; and step S403, displaying the target cells in the third image according to the display icons and/or the display colors corresponding to the cell types.

Regarding the steps S401-S403 mentioned above, it may be understood that, in this embodiment of the present disclosure, a corresponding display icon and/or a display color may be set for the cell types of the target cells previously, that is, a preset correspondence relationship between a cell type and display icon and/or display color may be set previously, so that the display icons and/or the display colors corresponding to the cell types may be determined according to the preset correspondence relationship after obtaining the cell types of the target cells through the deep learning detection model, and the cell types of the target cells may be displayed simultaneously through the corresponding display icons and/or the display colors when the third image is displayed, so that it is convenient for the relevant reader to understand the specific conditions of the target cells intuitively.

In this embodiment of the present disclosure, automatic detection of target cells in larger images in different image formats may be achieved by performing format conversion, image segmentation and depth learning detection model, and the target cells may be automatically marked according to the detected position information and the arrangement positions during image segmentation, the omission of detecting and marking of target cells is avoided, the comprehensiveness of detecting and marking of target cells is ensured, and the accuracy and the reliability of detection of target cells are improved; additionally, subjective dependence on a reader may be reduced by visual display of the marking result after format reduction, and it is convenient for the reader to get to know the conditions of markings of the target cells quickly.

It should be understood that, value of serial number of the steps in the aforesaid embodiment doesn't mean a sequencing of execution sequences of the steps, the execution sequence of each of the steps should be determined by functions and internal logic of the steps, and shouldn't be regarded as limitation to an implementation process of the embodiment of the present disclosure.

The descriptions mentioned above mainly describe an image-based target cell marking method, an image-based target cell marking device will be described in detail below.

Figure 5:
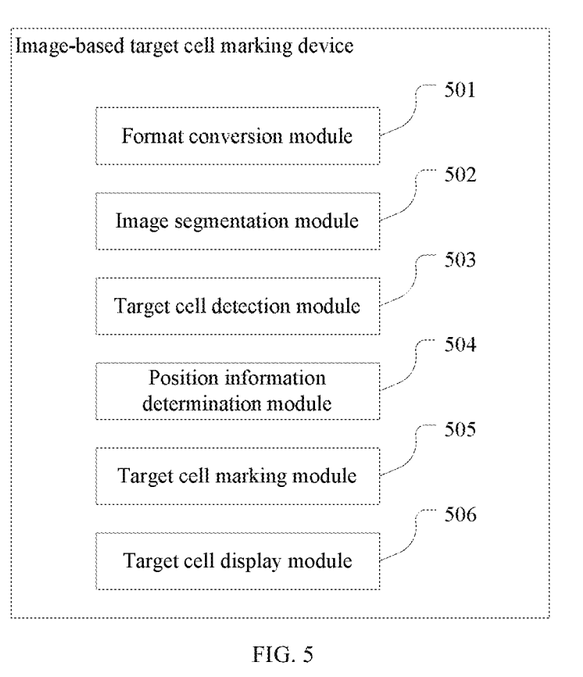
FIG. 5 illustrates a schematic structural diagram of an image-based target cell marking device in one embodiment of the present disclosure.

As shown in FIG. 5, the embodiments of the present disclosure provides an image-based target cell marking device 5, including:

- a format conversion module 501 configured to obtain an original scanned image, determine an original image format of the original scanned image, and convert the original scanned image into a first image in a preset image format;
- an image segmentation module 502 configured to segment the first image into a plurality of image blocks according to a preset segmentation mode, and record arrangement positions of the image blocks in the first image;
- a target cell detection module 503 configured to input the image blocks into a preset deep learning detection model respectively to obtain first position information of target cells in the image blocks, which is output by the deep learning detection model;
- a position information determination module 504 configured to determine second position information of the target cells in the first image according to the first position information and corresponding arrangement positions;
- a target cell marking module 505 configured to integrate the image blocks according to the arrangement positions, and mark the target cells in the second image according to the second position information, wherein the second image is obtained by integrating the image blocks; and
- a target cell display module 506 configured to convert the second image marked by the target cells into a third image in the original image format, and to display the third image.

Further, the target cell detection module 503 may include:
- an image block classification unit configured to input the image blocks into a preset classification model to obtain a classification result of the image blocks output by the classification model;
- a classification group determination unit configured to determine a classification group that meets a first preset condition in the classification result; and
- a target cell detection unit configured to input an image block corresponding to the classification group into the preset deep learning detection model to obtain first position information of a target cell in the image block, which is output by the deep learning detection model.

Preferably, the image segmentation module 502 may include:
- an image information acquisition unit configured to obtain distribution conditions of cells and an image size of the first image; and
- an image segmentation unit configured to segment the first image into the image blocks having a preset image size according to the distribution conditions of cells and the image size.

Optionally, the target cell marking device may further include:
- a first sample image block selection module configured to select a preset number of sample image blocks;
- a first sample image block marking module configured to mark standard position information of the target cells in the sample image blocks according to conditions of the target cells in the sample image blocks;
- a first training position information acquisition module configured to input the sample image blocks into an initial deep learning detection model to obtain training position information of the target cells in the sample image blocks, which is output by the initial deep learning detection model;
- an error calculation module configured to calculate a first error between the training position information and the standard position information;
- a first module parameter adjustment module configured to adjust a model parameter of the deep learning detection model, take the deep learning detection model after parameter adjustment as the initial deep learning detection model, and return to perform the step of inputting the sample image blocks into an initial deep learning detection model and the subsequent steps, if the first error does not meet a second preset condition; and
- a training completion determination module configured to determine that training of the deep learning detection model is completed, if the first error meets the second preset condition.

Furthermore, the target cell marking device may further include:
- a second sample image block selection module configured to select a preset number of sample image blocks;
- a second sample image block marking module configured to mark the standard position information and standard cell types of the target cells in the sample image blocks according to conditions of the target cells in the sample image blocks;
- a second training result acquisition module configured to input the sample image blocks into the initial deep learning detection model to obtain training position information and a training cell type of each target cell in the sample image blocks, which are output by the initial deep learning detection model;
- a second error calculation module configured to calculate a second error between the training position information and the standard position information, and to calculate a third error between the training cell type and the standard cell type;
- a second module parameter adjustment module configured to adjust a model parameter of the deep learning detection model and take the deep learning detection model after parameter adjustment as the initial deep learning detection model, and return to perform the step of inputting the sample image blocks to the initial deep learning detection model and the subsequent steps, if the second error does not meet a third preset condition or the third error does not meet a fourth preset condition; and
- a second training completion determination module configured to determine that training of the deep learning detection model is completed, if the second error meets the third preset condition, and the third error meets the fourth preset condition.

Preferably, the target cell display module 506 may include:
- a cell type acquisition unit configured to obtain cell types of the target cells in the third image;
- an icon color determination unit configured to determine display icons and/or display colors corresponding to the cell types of the target cells according to a preset correspondence relationship; and a target cell display unit configured to display the target cells in the third image according to the display icons and/or the display colors corresponding to the cell types respectively.

Figure 6:
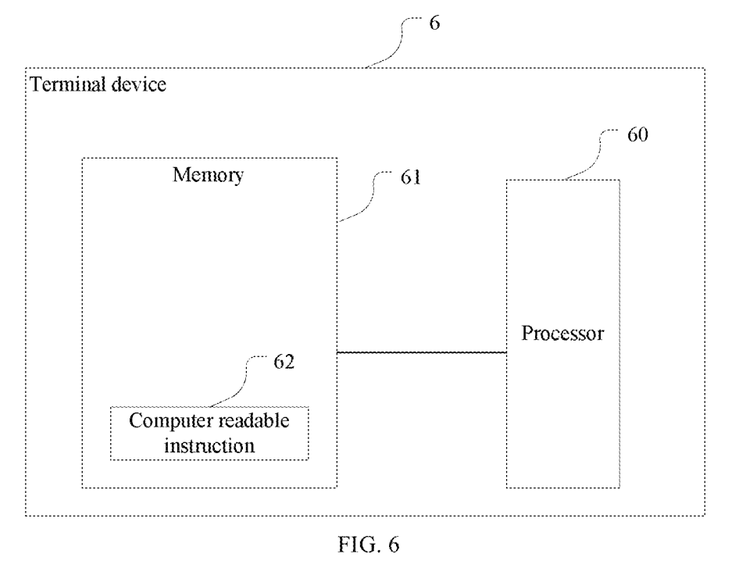
FIG. 6 illustrates a schematic structural diagram of a terminal device provided in one embodiment of the present disclosure.

FIG. 6 illustrates a schematic diagram of a terminal device 6 provided by one embodiment of the present disclosure. As shown in FIG. 5, the terminal device 6 in this embodiment includes: a processor 60, a memory 61 and a computer readable instruction 62 stored in the memory 61 and executable by the processor 60, the computer readable instruction 62 may be such as image-based target cell marking procedures. The processor 60 is configured to, when executing the computer readable instruction 62, implement the steps in the embodiment of the image-based target cell marking method, the steps may be such as the steps S101-S106 as shown in FIG. 1. As an alternative, the processor 60 is configured to, when executing the computer readable instruction 62, implement the functions of the various modules/units such as the modules 501-506 shown in FIG. 5 in the various device embodiments.

Exemplarily, the computer readable instruction 62 may be divided into one or a plurality of modules/units, the one or plurality of modules/units are stored in the memory 61, and executed by the processor 60 so as to implement the present disclosure. The one or plurality of modules/units may be a series of computer program instruction segments that can accomplish particular functionalities, these instruction segments are used for describing an executive process of the computer readable instruction 62 in the terminal device 6.

The terminal device 6 may be a computing device such as a desktop computer, a notebook, a palm computer, and the like, the terminal device 6 may include but is not limited to: the processor 60, the memory 61. The person of ordinary skill in the art may be aware of the fact that, FIG. 6 is merely an example of the terminal device 6, and is not constituted as limitation to the terminal device 6, more or less components shown in FIG. 6 may be included, or some components or different components may be combined; for example, the terminal device may also include an input and output device, a network access device, a bus, etc.

The so called processor 60 may be CPU (Central Processing Unit), and may also be other general purpose processor, DSP (Digital Signal Processor), ASIC (Application Specific integrated Circuit), FGPA (Field-Programmable Gate Array), or some other programmable logic devices, discrete gate or transistor logic device, discrete hardware component, etc. The general purpose processor may be a microprocessor, or as an alternative, the processor may also be any conventional processor, and the like.

The memory 61 may be an internal storage unit of the terminal device 6, such as a hard disk or a memory of the terminal device 6. The memory 61 can also be an external storage device of the terminal device 6, such as a plug-in hard disk, a SMC (Smart Media Card), a SD (Secure Digital) card, a FC (Flash Card) equipped on the terminal device 6. Further, the memory 61 may not only include the internal storage unit of the terminal device 6 but also include the external storage device of the terminal device 6. The memory 61 is configured to store the computer program, and other procedures and data needed by the terminal device 6. The memory 61 may also be configured to store data that has been output or being ready to be output temporarily.

Additionally, the various functional units in the embodiments may be integrated into a processing unit, optionally, each of the units exists independently and physically, optionally, two or more than two of the units are integrated into a single unit. This integrated unit may either be realized in the form of hardware or be realized in the form of software functional units.

The person of ordinary skilled in the art may be aware of that, a whole or a part of flow process of implementing the method in the aforesaid embodiments of the present disclosure may be accomplished by using computer program to instruct relevant hardware. The computer program may be stored in a non-volatile computer readable storage medium, when the computer program is executed, the steps in the various method embodiments described above may be included. Any references to memory, storage, databases, or other media used in the embodiments provided herein may include non-volatile and/or volatile memory. The non-volatile memory may include ROM (Read Only Memory), programmable ROM, EPROM (Electrically Programmable Read Only Memory), EEPROM (Electrically Erasable Programmable Read Only Memory), or flash memory. The volatile memory may include RAM (Random Access Memory) or external cache memory. By way of illustration instead of limitation, RAM is available in a variety of forms such as SRAM (Static RAM), DRAM (Dynamic RAM), SDRAM (Synchronous DRAM), DDR (Double Data Rate) SDRAM, ESDRAM (Enhanced SDRAM), Synchlink DRAM, RDRAM (Rambus Direct RAM), DRDRAM (Direct RamBus Dynamic RAM), and RDRAM (Rambus Dynamic RAM), etc.

As stated above, the embodiments discussed above are merely used to explain the technical solutions of the present disclosure, and are not intended to limit the technical solutions of the present disclosure. Although the present disclosure has been described in detail with reference to the aforesaid embodiments, the person of ordinary skill in the art may be aware of that, the technical solutions described in the embodiments may still be modified, or some technical features in the embodiments may be replaced equivalently. However, these modifications or substitutions do not make the essences of corresponding technical solutions depart from the spirit and the scope of the technical solutions of the embodiments of the present disclosure.

What is claimed is:

1. An image-based target cell marking method, performed on a terminal device, comprising:
    obtaining an original scanned image, determining an original image format of the original scanned image, and converting the original scanned image into a first image in a preset image format;
    segmenting the first image into a plurality of image blocks according to a preset image segmentation mode, and recording arrangement positions of the plurality of image blocks in the first image;
    inputting the plurality of image blocks into a preset deep learning detection model respectively to obtain first position information of target cells in the plurality of image blocks through the preset deep learning detection model;
    determining second position information of the target cells in the first image according to the first position information and corresponding arrangement positions;
    integrating the plurality of image blocks to obtain a second image according to the arrangement positions, and marking the target cells in the second image according to the second position information; and
    converting the second image marked by the target cells into a third image in the original image format, and displaying the third image.

2. The target cell marking method according to claim 1, wherein the step of inputting the plurality of image blocks into a preset deep learning detection model respectively to obtain first position information of target cells in the plurality of image blocks through the preset deep learning detection model comprises:
  inputting the plurality of image blocks into a preset classification model to obtain a classification result of the plurality of image blocks through the classification model;
  determining a classification group that meets a first preset condition in the classification result; and
  inputting an image block corresponding to the classification group into the preset deep learning detection model to obtain first position information of a target cell in the image block through the preset deep learning detection model.

3. The target cell marking method according to claim 1, wherein the step of segmenting the first image into a plurality of image blocks according to a preset image segmentation mode comprises:
  obtaining distribution conditions of cells and an image size of the first image; and
  segmenting the first image into the plurality of image blocks having a preset image size according to the distribution conditions of cells and the image size.

4. The target cell marking method according to claim 1, wherein the preset deep learning detection model is obtained by training according to the following steps:
  selecting a preset number of sample image blocks;
  marking standard position information of the target cells in the preset number of sample image blocks according to conditions of the target cells in the preset number of sample image blocks;
  inputting the sample image blocks into an initial deep learning detection model to obtain training position information of the target cells in the sample image blocks through the initial deep learning detection model;
  determining a first error between the training position information and the standard position information;
  adjusting a model parameter of the preset deep learning detection model, and taking the preset deep learning detection model after parameter adjustment as the initial deep learning detection model, and returning to perform the step of inputting the preset number of sample image blocks into an initial deep learning detection model and the subsequent steps, if the first error does not meet a second preset condition; and
  determining that training of the preset deep learning detection model is completed, if the first error meets the second preset condition.

5. The target cell marking method according to claim 1, wherein the preset deep learning detection model is obtained by training according to the following steps:
  selecting a preset number of sample image blocks;
  marking the standard position information and standard cell type of the target cells in the preset number of sample image blocks according to conditions of the target cells in the preset number of sample image blocks;
  inputting the preset number of sample image blocks into an initial deep learning detection model to obtain training position information and a training cell type of each of the target cells in the preset number of sample image blocks through the initial deep learning detection model;
  determining a second error between the training position information and the standard position information and determining a third error between the training cell type and the standard cell type;
  adjusting a model parameter of the preset deep learning detection model, and taking the preset deep learning detection model after parameter adjustment as the initial deep learning detection model, and returning to perform the step of inputting the preset number of sample image blocks to the initial deep learning detection model and the subsequent steps, if the second error does not meet a third preset condition or the third error does not meet a fourth preset condition; or
  determining that training of the preset deep learning detection model is completed, if the second error meets the third preset condition, and the third error meets the fourth preset condition.

6. The target cell marking method according to claim 5, wherein the step of displaying the third image comprises:
  obtaining cell types of the target cells in the third image;
  determining display icons and/or display colors corresponding to the cell types of the target cells according to a preset correspondence relationship; and
  displaying the target cells in the third image according to the display icons and/or the display colors corresponding to the cell types of the target cells respectively.

7. A non-volatile computer readable storage medium which stores a computer readable instruction, wherein the computer readable instruction is configured to be executed by a processor to cause the processor to implement following steps:
  obtaining an original scanned image, determining an original image format of the original scanned image, and converting the original scanned image into a first image in a preset image format;
  segmenting the first image into a plurality of image blocks according to a preset image segmentation mode, and recording arrangement positions of the image blocks in the first image;
  respectively inputting the plurality of image blocks into a preset deep learning detection model to obtain first position information of target cells in the plurality of image blocks through the preset deep learning detection model;
  determining second position information of the target cells in the first image according to the first position information and corresponding arrangement positions;
  integrating the plurality of image blocks to obtain a second image according to the arrangement positions, and marking the target cells in the second image according to the second position information; and
  converting the second image marked by the target cells into a third image in the original image format, and displaying the third image.

8. The computer readable storage medium according to claim 7, wherein the step of respectively inputting the plurality of image blocks into a preset deep learning detection model to obtain first position information of target cells in the plurality of image blocks through the preset deep learning detection model comprises:
  inputting the plurality of image blocks into a preset classification model to obtain a classification result of the plurality of image blocks output by the classification model;
  determining a classification group that meets a first preset condition in the classification result; and inputting an image block corresponding to the classification group into the preset deep learning detection model to obtain first position information of a target cell in the image block through the preset deep learning detection model.

9. A terminal device, comprising a memory, a processor and a computer readable instruction stored in the memory and executable by the processor, wherein the processor is configured to execute the computer readable instruction to implement following steps of:

obtaining an original scanned image, determining an original image format of the original scanned image, and converting the original scanned image into a first image in a preset image format;

segmenting the first image into a plurality of image blocks according to a preset image segmentation mode, and recording arrangement positions of the plurality of image blocks in the first image;

respectively inputting the plurality of image blocks into a preset deep learning detection model to obtain first position information of target cells in the plurality of image blocks through the preset deep learning detection model;

determining second position information of the target cells in the first image according to the first position information and corresponding arrangement positions;

integrating the plurality of image blocks to obtain a second image according to the arrangement positions, and marking the target cells in the second image according to the second position information; and converting the second image marked by the target cells into a third image in the original image format, and displaying the third image.

10. The terminal device according to claim 9, wherein the step of respectively inputting the plurality of image blocks into a preset deep learning detection model to obtain first position information of target cells in the plurality of image blocks through the preset deep learning detection model comprises:

inputting the plurality of image blocks into a preset classification model to obtain a classification result of the plurality of image blocks through the classification model;

determining a classification group that meets a first preset condition in the classification result; and inputting an image block corresponding to the classification group into the preset deep learning detection model to obtain first position information of a target cell in the image block through the preset deep learning detection model.

11. The terminal device according to claim 9, wherein the step of segmenting the first image into a plurality of image blocks according to a preset image segmentation mode comprises:

obtaining distribution conditions of cells and an image size of the first image; and segmenting the first image into the plurality of image blocks having a preset image size according to the distribution conditions of cells and the image size.

12. The terminal device according to claim 9, wherein the preset deep learning detection model is obtained by training according to the following steps:

selecting a preset number of sample image blocks;

marking standard position information of the target cells in the preset number of sample image blocks according to conditions of the target cells in the preset number of sample image blocks;

inputting the preset number of sample image blocks into an initial deep learning detection model to obtain training position information of the target cells in the preset number of sample image blocks through the initial deep learning detection model;

determining a first error between the training position information and the standard position information;

adjusting a model parameter of the preset deep learning detection model, and taking the preset deep learning detection model after parameter adjustment as the initial deep learning detection model, and returning to perform the step of inputting the preset number of sample image blocks into an initial deep learning detection model and the subsequent steps, if the first error does not meet a second preset condition; and determining that training of the preset deep learning detection model is completed, if the first error meets the second preset condition.

13. The terminal device according to claim 9, wherein the preset deep learning detection model is obtained by training according to the following steps:

selecting a preset number of sample image blocks;

marking the standard position information and standard cell type of the target cells in the preset number of sample image blocks according to conditions of the target cells in the preset number of sample image blocks;

inputting the preset number of sample image blocks into an initial deep learning detection model to obtain training position information and a training cell type of each target cell in the preset number of sample image blocks through the initial deep learning detection model;

determining a second error between the training position information and the standard position information and determining a third error between the training cell type and the standard cell type;

adjusting a model parameter of the preset deep learning detection model, and taking the preset deep learning detection model after parameter adjustment as the initial deep learning detection model, and returning to perform the step of inputting the preset number of sample image blocks to the initial deep learning detection model and the subsequent steps, if the second error does not meet a third preset condition or the third error does not meet a fourth preset condition; or determining that training of the preset deep learning detection model is completed, if the second error meets the third preset condition, and the third error meets the fourth preset condition.

14. The terminal device according to claim 13, wherein the step of displaying the third image comprises:

obtaining cell types of the target cells in the third image;

determining display icons and/or display colors corresponding to the cell types of the target cells according to a preset correspondence relationship; and displaying the target cells in the third image according to the display icons and/or the display colors corresponding to the cell types of the target cells respectively.

15. The target cell marking method according to claim 2, wherein the preset deep learning detection model is obtained by training according to the following steps:

selecting a preset number of sample image blocks;

marking standard position information of the target cells in the preset number of sample image blocks according to conditions of the target cells in the preset number of sample image blocks;

inputting the preset number of sample image blocks into an initial deep learning detection model to obtain training position information of the target cells in the preset number of sample image blocks through the initial deep learning detection model;

determining a first error between the training position information and the standard position information;

adjusting a model parameter of the preset deep learning detection model, and taking the preset deep learning detection model after parameter adjustment as the initial deep learning detection model, and returning to perform the step of inputting the preset number of sample image blocks into an initial deep learning detection model and the subsequent steps, if the first error does not meet a second preset condition; and determining that training of the preset deep learning detection model is completed, if the first error meets the second preset condition.

16. The target cell marking method according to claim 3, wherein the preset deep learning detection model is obtained by training according to the following steps:

selecting a preset number of sample image blocks;

marking standard position information of the target cells in the preset number of sample image blocks according to conditions of the target cells in the preset number of sample image blocks;

inputting the preset number of sample image blocks into an initial deep learning detection model to obtain training position information of the target cells in the preset number of sample image blocks through the initial deep learning detection model;

determining a first error between the training position information and the standard position information;

adjusting a model parameter of the preset deep learning detection model, and taking the preset deep learning detection model after parameter adjustment as the initial deep learning detection model, and returning to perform the step of inputting the preset number of sample image blocks into an initial deep learning detection model and the subsequent steps, if the first error does not meet a second preset condition; and determining that training of the preset deep learning detection model is completed, if the first error meets the second preset condition.

17. The target cell marking method according to claim 2, wherein the preset deep learning detection model is obtained by training according to the following steps:

selecting a preset number of sample image blocks;

marking the standard position information and standard cell type of the target cells in the preset number of sample image blocks according to conditions of the target cells in the sample image blocks;

inputting the preset number of sample image blocks into an initial deep learning detection model to obtain training position information and a training cell type of each of the target cells in the preset number of sample image blocks through the initial deep learning detection model;

determining a second error between the training position information and the standard position information and determining a third error between the training cell type and the standard cell type;

adjusting a model parameter of the preset deep learning detection model, and taking the preset deep learning detection model after parameter adjustment as the initial deep learning detection model, and returning to perform the step of inputting the preset number of sample image blocks to the initial deep learning detection model and the subsequent steps, if the second error does not meet a third preset condition or the third error does not meet a fourth preset condition; or determining that preset training of the deep learning detection model is completed, if the second error meets the third preset condition, and the third error meets the fourth preset condition.

18. The target cell marking method according to claim 3, wherein the preset deep learning detection model is obtained by training according to the following steps:

selecting a preset number of sample image blocks;

marking the standard position information and standard cell type of the target cells in the preset number of sample image blocks according to conditions of the target cells in the preset number of sample image blocks;

inputting the preset number of sample image blocks into an initial deep learning detection model to obtain training position information and a training cell type of each of the target cells in the sample image blocks through the initial deep learning detection model;

determining a second error between the training position information and the standard position information and determining a third error between the training cell type and the standard cell type;

adjusting a model parameter of the preset deep learning detection model, and taking the preset deep learning detection model after parameter adjustment as the initial deep learning detection model, and returning to perform the step of inputting the preset number of sample image blocks to the initial deep learning detection model and the subsequent steps, if the second error does not meet a third preset condition or the third error does not meet a fourth preset condition; or determining that training of the preset deep learning detection model is completed, if the second error meets the third preset condition, and the third error meets the fourth preset condition.

19. The terminal device according to claim 10, wherein the preset deep learning detection model is obtained by training according to the following steps:

selecting a preset number of sample image blocks;

marking standard position information of the target cells in the preset number of sample image blocks according to conditions of the target cells in the preset number of sample image blocks;

inputting the preset number of sample image blocks into an initial deep learning detection model to obtain training position information of the target cells in the preset number of sample image blocks through the initial deep learning detection model;

determining a first error between the training position information and the standard position information;

adjusting a model parameter of the preset deep learning detection model, and taking the preset deep learning detection model after parameter adjustment as the initial deep learning detection model, and returning to perform the step of inputting the preset number of sample image blocks into an initial deep learning detection model and the subsequent steps, if the first error does not meet a second preset condition; and determining that training of the preset deep learning detection model is completed, if the first error meets the second preset condition.

20. The terminal device according to claim 10, wherein the preset deep learning detection model is obtained by training according to the following steps:
- selecting a preset number of sample image blocks;
- marking the standard position information and standard cell type of the target cells in the preset number of sample image blocks according to conditions of the target cells in the preset number of sample image blocks;
- inputting the preset number of sample image blocks into an initial deep learning detection model to obtain training position information and a training cell type of each target cell in the preset number of sample image blocks through the initial deep learning detection model;
- determining a second error between the training position information and the standard position information and determining a third error between the training cell type and the standard cell type;
- adjusting a model parameter of the preset deep learning detection model, and taking the preset deep learning detection model after parameter adjustment as the initial deep learning detection model, and returning to perform the step of inputting the preset number of sample image blocks to the initial deep learning detection model and the subsequent steps, if the second error does not meet a third preset condition or the third error does not meet a fourth preset condition; or
- determining that training of the preset deep learning detection model is completed, if the second error meets the third preset condition, and the third error meets the fourth preset condition.

* * * * *